United States Patent [19]

Kufferath-Kassner

[11] 4,249,653
[45] Feb. 10, 1981

[54] WIRE MESH BAND

[75] Inventor: Karl Kufferath-Kassner, Duren-Mariaweiler, Fed. Rep. of Germany

[73] Assignee: GKD Gebr. Kufferath GmbH & Co. KG, Duren-Mariaweiler, Fed. Rep. of Germany

[21] Appl. No.: 108,032

[22] Filed: Dec. 28, 1979

[30] Foreign Application Priority Data

Jan. 11, 1979 [DE] Fed. Rep. of Germany ....... 2900868

[51] Int. Cl.³ .................... B65G 15/54; B65G 15/30
[52] U.S. Cl. ................................. 198/848; 198/840
[58] Field of Search ................. 198/848, 840, 844; 74/240

[56] References Cited

U.S. PATENT DOCUMENTS 3,154,459  10/1964  Cranston ..................... 198/848
3,368,663  2/1968   Kufferath .

FOREIGN PATENT DOCUMENTS 26063  10/1906  Austria ............................. 198/844
158782  2/1921  United Kingdom ............... 198/844

Primary Examiner—Robert B. Reeves
Assistant Examiner—Brian Bond
Attorney, Agent, or Firm—Meyer, Tilberry & Body

[57] ABSTRACT

A wire mesh band or belt with mutually crossing warp wires and weft wires for a conveyor system with grooved support rollers is provided with downwardly extending protrusions. The protrusions are warp wire free providing great flexibility for the band in the longitudinal direction. The protrusions can be formed in all the weft wires or only in selected strengthened weft wires with the remaining weft wires woven into the fabric after the protrusions are formed.

10 Claims, 5 Drawing Figures

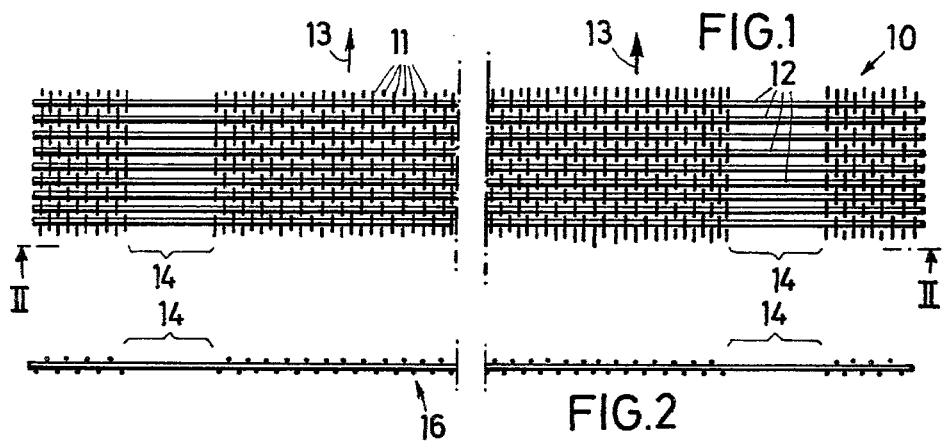
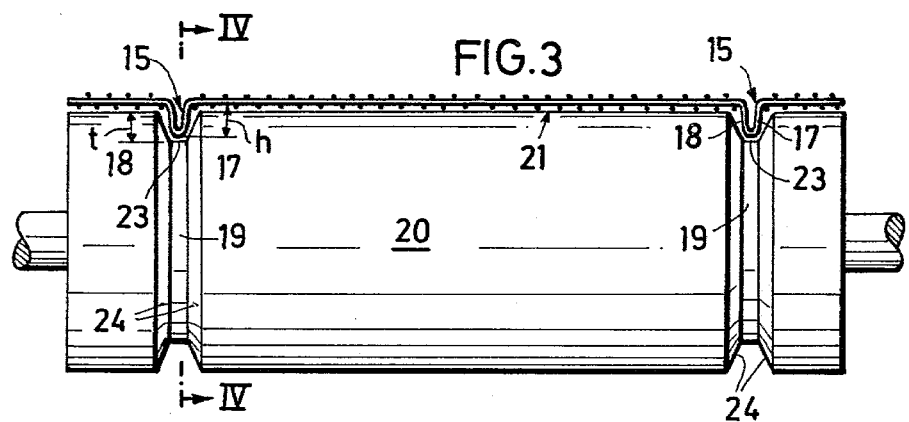
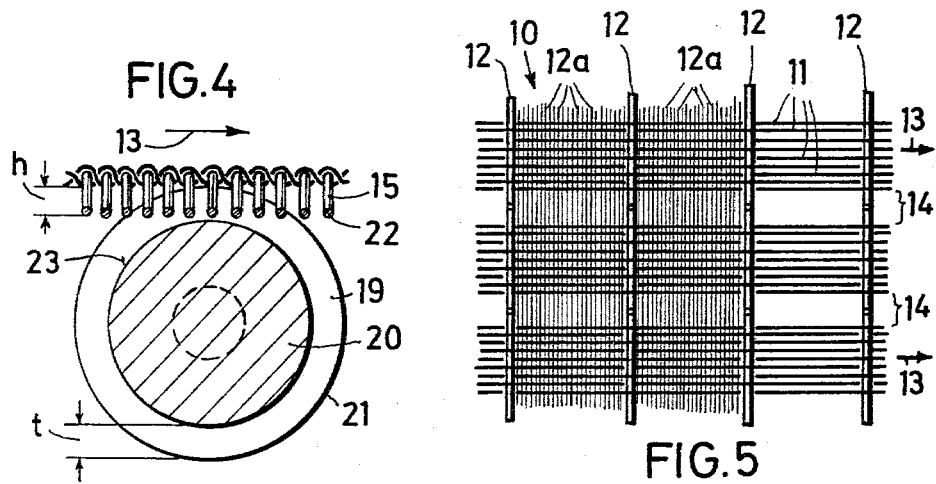

WIRE MESH BAND

The invention relates to a wire mesh band or belt with mutually crossing warp and weft wires for a conveyor device with driving and return rollers. The weft wires are oriented transversely to the transport direction and exhibit protrusions bent downwardly beyond that underside of the band which engage in guide grooves in the circumference of the rollers.

A wire mesh band of this type is described in U.S. Pat. No. 3,368,663 wherein the weft wires in the mesh have V-shaped protrusions arranged at an interval of twice the warp pitch. These protrusions engage peripheral grooves of rollers guiding the band laterally. Wire mesh bands equipped with such protrusions can only be constructed as wide mesh fabrics. The width of the meshes in the fabric is considerably greater than their length in the transport direction. Even with extremely wide meshes, each weft wire still has a large number of protrusions so that a correspondingly large number of peripheral grooves to guide the band must be provided in supporting, driving and return rollers of the conveyor device. The production of such grooves in the rollers of the conveyor device involves substantial costs.

It is an object of the present invention to produce a wire mesh band which exhibits fewer protrusions across its width on its underside and consequently requires fewer peripheral grooves in support rollers for its guidance and which can have any desired mesh shape and fabric weave.

It is a further object of the invention to produce a wire mesh band with guiding protrusions which exhibits greater flexibility in the longitudinal direction.

It is yet another object of the present invention to provide a small mesh band with protrusions without significantly interrupting the mesh structure.

These objects are achieved according to the invention in that the wire mesh band exhibits no warp threads in the region of the protrusions.

This configuration has the advantage that the protrusions can be arranged at any desired interval and in any desired number across the width of the wire mesh band irrespectively of the type and interval dimensions of the fabric weave. Furthermore, the arrangement of the protrusions is not restricted to wide mesh fabrics but can also be provided in the case of square mesh fabrics and fabrics having a tight weave.

The procedure adopted in the production of the wire mesh band according to the invention is that during the weaving process, lanes are left clear in the fabric in the warp direction in which no warp wires are present. The weft threads are bent downward in the region of said lanes to form downwardly projecting protrusions.

Because the weft wires do not bind in the region of the protrusions, the apex points of the protrusions can move towards and away from each other unconstrainedly in the peripheral grooves of the rollers as the band revolves round the rollers of the conveyor device. The wire mesh band is consequently particularly flexible in its longitudinal direction. Simultaneously, the protrusions achieve good lateral guidance of the wire mesh band which is not inferior to the guidance of the known protrusion bands. In practical trials it has been discovered that even with a strong oblique positioning of the rollers only one or two peripheral grooves per meter of width, and a corresponding number of protrusions, are sufficient for correspondingly wide band in order to retain the wire mesh band in its track and to prevent lateral wandering.

It is particularly convenient if the downwardly bent protrusions are U-shaped and the arms of the U-shaped protrusions are closely juxtaposed. The region without warp threads is then very small in the finished state of the wire mesh band, so that the mesh structure of the fabric is scarcely modified or interrupted in the region of the protrusions.

In the case of wire mesh bands with such U-shaped protrusions, the peripheral grooves in the rollers to guide the bands are conveniently of V-shaped or trapezoidal construction so that protrusions which strike lateral faces of the peripheral grooves in the rollers can easily slide into the grooves when the band wanders. It is convenient if the downwardly bent protrusions have a height which is smaller than the depth of the guide grooves in the rollers in order that the mesh band rests fully upon the peripheral surface of the rollers over its entire width and is not supported through the protrusion vertices in the bottom of the grooves.

According to a further feature of the invention, conveniently only individual weft wires arranged at a large interval in the transport direction of the band are provided with protrusions whereas the weft wires present between them exhibit no protrusions. Such a construction is convenient for the thin-wired square mesh fabrics which travel round rollers of large diameter and show little tendency to wander. The weft wires with protrusions arranged at a great interval are then quite sufficient for the guidance of the wire mesh band.

According to the invention the weft wires provided with the protrusions may have a greater thickness than the warp wires. The wire mesh band is then extremely flexible in the longitudinal direction, whereas it is comparatively rigid in the transverse direction. Such a construction is in fact desirable where an extemely flat band is required for the transport of goods in a production process.

The weft wires provided with the protrusions may furthermore possess a greater thickness and/or a higher strength than the remaining weft wires. In this way it is possible to guide reliably conveyor bands with a fabric made of extremely thin wires.

The invention may take form in certain parts and arrangements of parts, preferred embodiments of which will be described in detail in this specification and illustrated in the accompanying drawings which form a part hereof and wherein:

FIG. 1 shows a wire mesh band according to the invention in a semifinished state in plan;

FIG. 2 shows the subject of FIG. 1 in a cross-section made along the line 2—2,

FIG. 3 shows a cross-section corresponding to FIG. 2 of a finished wire mesh band according to the invention which is resting upon a supporting roller of a conveyor device;

FIG. 4 shows the subject of FIG. 3 in a section made along the line 4—4 of FIG. 3, which shows the roller in cross-section and the wire mesh band in a partial longitudinal section; and, FIG. 5 shows a further exemplary embodiment of the invention in a view corresponding to FIG. 1.

In the drawings, 10 designates a wire mesh band or belt for a conveyor device, which is fabricated from comparatively thin warp wires 11 and substantially thicker weft wires 12 crossing the warp wires at right angles. The warp wires 11 in the wire mesh band are oriented in the longitudinal or transport direction 13 and are woven with the transversely oriented weft wires to form a square mesh fabric as is well known.

It will be seen from FIGS. 1 and 2 that between the warp wires 11, two lanes 14 have been left clear in the band in which the weft wires 12 are exposed and in which no warp wires 11 are present. In the course of the production process the weft wires 12 are bent in the region of said lanes to form U-shaped protrusions 15 which project beyond the underside 16 of the wire mesh 10.

It will be seen from FIG. 3 that the two arms 17 and 18 of the U-shaped protrusions are closely juxtaposed and engage in two trapezoidal grooves 19 which are arranged on the circumference of the rollers 20 of a conveyor device not completely shown here. The protrusions 15 have a height h which is smaller than the depth t of the guide grooves 19 in the rollers, so that the wire mesh band 10 rests fully upon the peripheral surface 21 of the rollers 20 and the apices 22 of the protrusions 15 do not touch the floor 23 of the guide grooves 19.

When the roller 20 rotates and the wire mesh band 10 travels across the roller in the direction of the arrow 13, it rests fully upon the circumference 21 of the roller and the protrusions 15 engage into the guide grooves 19 of the roller. When the wire mesh band 10 tends to wander due to unilateral heating of the band or due to slight skewing of the rollers or for any other reason, the protrusions 15 slide down repeatedly on the oblique surfaces 24 of the guide grooves 19 into the guide grooves 19 and thus draw the band straight again.

FIG. 5 shows another wire mesh band 10 according to the invention which is fabricated from thin warp wires 11 and thin weft wires 12a. Some thicker weft wires 12 are also provided at large intervals in the transport direction 13 of the band 10. Just as in the embodiment of FIGS. 1 to 4, lanes 14 are left in the band in the region of which protrusions are bent downward out of the weft wires 12.

According to FIG. 5, the wire mesh band can have various forms in the final state. It is possible to weave-in the weft wires 12 arranged at long intervals together with the thinner weft wires 12a and to leave the lanes 14 clear. Afterwards, protrusions are bent forward in the region of the lanes 14. In this type of band, not only the thicker weft wires 12 but also the thinner weft wires 12a are provided with protrusions. Such a band is shown in the left-hand half of FIG. 5 in its intermediate stage before the bending of the protrusions.

The right-hand half of FIG. 5 shows a wire mesh fabric in which the individual thicker weft wires 12 are initially woven with the warp wires 11. Then the weft wires 12 are bent downwards in the region of the lanes 14. Only after this are the thin weft wires 12a woven-in, which likewise cross the warp wires 11 at right angles and continue in straight lines.

The invention is industrially applicable quite generally in conveyor engineering. It is particularly suitable for conveyor bands or belts which are permeable or are required to have sieve-like properties.

The invention has been described in connection with preferred embodiments. Obviously, it is possible to arrange protrusions in the band in other manners and a number of variants are possible without departing from the ambit of the invention. For example, the protrusions may also be V-shaped and the weft wires may have the same thickness as the warp wires. It is also possible to use a material of higher strength for the weft wires provided with protrusions than for the remaining weft wires. It may particularly be convenient to produce a mixed fabric in which the weft wires consist of a different material from the warp wires. For example, the weft wires provided with protrusions may be steel wires, whereas the warp wires may consist of bronze or plastic wires. These and other modifications and variations will occur to others upon a reading of this specification. It is intended to include all such modifications and variations insofar as they come within the scope of the appended claims.

Having thus described the invention, I claim:

1. A wire mesh band for a conveyor system with driving rollers and return rollers having guide grooves on the circumference thereof: said band having mutually crossing warp wires and weft wires; said warp wires being oriented longitudinally in the transport direction and grouped into warp wire lanes having warp free lanes disposed therebetween; said weft wires being bent downwardly in said warp wire free lanes forming protrusions extending downwardly beyond the lower surface of said band such that said warp wire lanes are in close transverse proximity in said band and said protrusions are warp wire free.

2. The improvement of claim 1 wherein said protrusions are U-shaped having two downwardly extending arms substantially parallel to one another and a bottom arm substantially perpendicular to said downwardly extending arms.

3. The improvement of claim 2 wherein said roller guide grooves have a given depth, said protrusions have a given height and said groove depth is greater than said protrusion height.

4. The improvement of claim 3 wherein said guide grooves have sidewalls, said sidewalls slanting outwardly and upwardly.

5. The improvement of claim 4 wherein said weft wires are divided into selected weft wires and remaining weft wires, said selected weft wires are bent downwardly to form protrusions, said remaining weft wires are not bent downwardly and a plurality of said remaining weft wires separate the selected weft wires one from the other.

6. The improvement of claim 5 wherein said selected weft wires have greater rigidity than said remaining weft wires.

7. A process of manufacturing a wire mesh band for a conveyor system with driving and return rollers including the steps of: weaving warp wires and weft wires together to form a fabric, said warp wires being grouped to form longitudinal lanes having no warp wires flanked by longitudinal lanes having groups of warp wires woven with said weft wires and bending said weft wires downwardly in said warp wire free lanes forming downwardly extending protrusions.

8. The process of claim 7 wherein the transverse width of said warp wire free lanes is selected such that said warp wire free lanes are bent downwardly substantially in its entirety such that said lanes containing groups of warp wires form substantially all of said band surface.

9. The process of claim 8 wherein said weft wires are bent downwardly to form U-shaped protrusions.

10. The process of claim 9 including the additional step of weaving additional weft wires into said fabric band after said original weft wires have been bent downwardly, said additional weft wires not being bent downwardly and having a smaller cross-sectional area than said original weft wires.

* * * * *